Oct. 14, 1958  F. LEUCHS  2,856,471

ELECTRIC CARBON BRUSHES

Filed Feb. 25, 1953

Inventor:
Friedrich Leuchs
By
Young, Emery & Thompson
Attys.

United States Patent Office 2,856,471
Patented Oct. 14, 1958

2,856,471

ELECTRIC CARBON BRUSHES

Friedrich Leuchs, Rothenbach (Pegnitz), Germany, assignor to Ella Kathe Conradty, Peter Conradty, Monika Conradty, and Claudio Conradty, trading as C. Conradty, Nurnberg, Germany, a German firm Application February 25, 1953, Serial No. 338,849

Claims priority, application Germany May 24, 1952

2 Claims. (Cl. 191—55)

This invention relates to a carbon brush member having a cast mount.

Carbon brush holders for street tracks and railroad tracks and provided with metal mounts cast round the carbon have been known for a long time.

In contrast to carbon brush members in which metal holders or retainers are applied by drawing, the former have the advantage that the carbon and metal are intimately connected together both electrically and mechanically as a result of the shrinkage forces set up when the metal cools. Such carbon brush holders provided with mounts cast around the carbon possess, however, certain disadvantages, i. e. the forces due to shrinkage of the metal impose considerable stresses in various directions on the carbon and unless special precautions are taken these stresses lead to fracture of the carbon. These special precautions comprise for example, interposing a shrinkage cushion of elastic metal gauze between the carbon and metal which are forced together during the shrinkage of the metal or comprise the expedient of casting a thin metal sheet between the carbon and metal fitting in order to provide a smooth slideway for the shrinking metal. An attempt has also been made to combine drawn metal parts with the material cast round the carbon. Such auxiliary expedients whilst leading to a serviceable carbon brush member do not in any way ensure reliability with reference to proper seating and electrical contact. A further disadvantage of the known mount cast round the carbon is its excessive weight. The entire carbon brush member comprising carbon and metal holder should, however, have the lowest possible weight with the highest possible mechanical and electrical qualities.

The present invention comprises a carbon current collector having a combined in-cast and embracing cast metal mount, preferably of light metal, of such a nature that without special precautions reliable electric contact and high strength are obtained, the entire weight being materially lower than the known values. The employment of a mount cast around the carbon and engaging the whole length of the carbon brush member is dispensed with and only those parts of the holder construction necessary for mechanical strength are retained. Further, the holder may be so applied that the carbon bar is not exposed to compressive or tensile strains after cooling of the cast metal holder.

The essential feature of this cast mount comprises making the casting in several sections and in such a manner that the shrinkage forces of the metal occurring in parts are so directed or dimensioned that they do not destroy the carbon and simultaneously yield a maximum in strength and electrical contact. In the result, however, the cast mount comprises a single piece without employing any additional mechanical connection such as by screwing, riveting or welding. The casting and shrinking process is so effected that a small metal rib is first of all cast in a longitudinal groove, for example of conical, T-shaped or furrowed form, in the under-side of the carbon bar, the shrinkage forces of the rib being such that no bending strain is imposed on the carbon bar but an intimate electrical contact is obtained between the carbon and metal bar. Since these bars are made as small as possible in weight they nevertheless have a high bearing strength throughout their entire length owing to their elevated profile.

This casting can be made by sand casting, injection casting or chill casting methods. After this metal bar has cooled, apertures (grooves or holes) may be provided at those positions on the bar where further casting operations are to be carried out in order to provide additional support or a better connection for the subsequent casting. In the second casting operation, the massive supporting end pieces are applied in such a way that they are cast, transversely to the direction of the metal bar, round the carbon foot formed in known manner as for example, of swallow-tail shape, the longitudinal expansion of these end members being kept as low as possible so that the shrinkage pressures primarily run transversely to the axis of the carbon brush member and do not cause deflection thereof. The initially cast metal bar thus becomes provided with cast end junctions. It is preferred to effect the casting of the two end members successively.

The carbon brush holder so obtained therefore possesses a cast metal holder, the shrinkage forces of which remain in the bar without effect on the carbon, whereas these shrinkage forces only occur in the end members in the horizontal direction. The holder is free from stress and possesses high mechanical strength.

In order, on aerodynamic grounds, to avoid air turbulence about the metal bar, a streamlined arched metal sheet may be applied over the under-side of the carbon holder. This construction is known per se. In the present invention, however, this metal sheet is formed as an auxiliary bearer or support, i. e. it advantageously comprises a resilient steel sheet which engages in the lateral swallow-tail grooves in the carbon throughout the entire length of the carbon brush member. The metal sheet itself is, however, mechanically and electrically connected by riveting or screwing to the under-side of the cast metal bearing bar and to the two cast end members. Accordingly, it contributes to rigidity of the entire current collector and to current feeding or current take-off.

A preferred form of the invention as applied by way of example to a straight carbon brush member is illustrated in the accompanying drawings, in which;

Fig. 1 illustrates a straight carbon brush member 1 in side elevation and shows it provided in the first working operation with a cast metal rib 2 which is provided at 8 in any desired manner with apertures, illustrated by way of example as holes.

Figure 2:
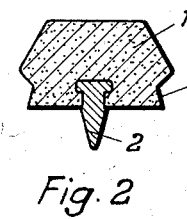
Figs. 2, 3 and 4 are cross sections of three different forms of the cast metal rib.
Figure 3:
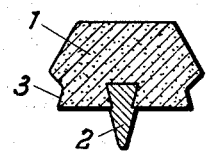
Figure 4:
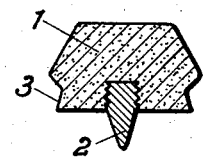

Figs. 2, 3 and 4 show different cross sectional shapes for the groove and bar. They also show the carbon bar 1 provided with lateral swallow-tail grooves 3 and the cast-in metal bar 2.

Figure 1:
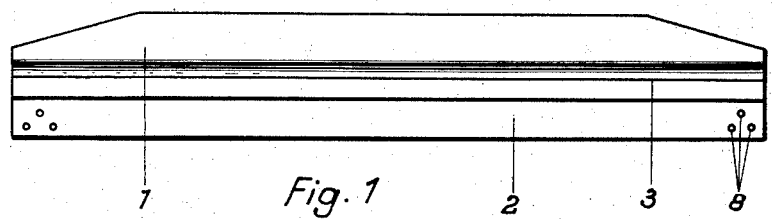
Figure 1 is a side elevation of the carbon brush according to the invention.
Figure 5:
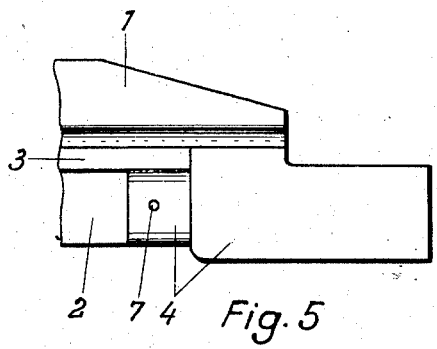
Fig. 5 is a side elevation of the end of the brush on an enlarged scale.
Figure 6:
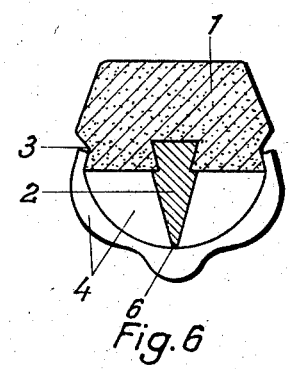
Fig. 6 is a cross section of the brush of Fig. 5.

Fig. 5 shows one end of the above brush member according to Fig. 1 with a shrunk-on end member as seen from the side in Fig. 5 and in cross section in Fig. 6. The end member 4 is cast round the metal bar 2 and the swallow-tail grooves 3 of carbon 1.

Figure 7:
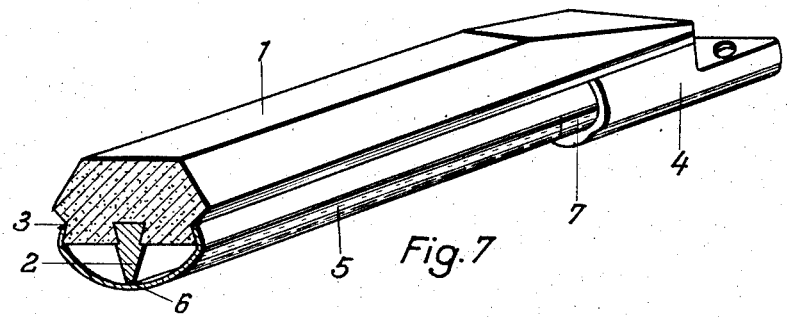
Fig. 7 is a perspective view partly in section of the brush of Figs. 5 and 6.

Fig. 7 is a perspective view of part of the carbon brush member complete with cast holder and a sheet metal cover 5 applied according to the invention, this cover being firmly connected with the end members at 7 and also with the metal bar at 6. Owing to its resilient nature, the cover supports the carbon brush member 1 proper by engaging in the swallow-tail recess 3.

Having thus described my invention, what I claim is new and desire to secure by Letters Patent of the United States is:

1. Carbon sliding contact element comprising a carbon brush member having top and bottom surfaces and a groove located intermediate and centrally of the sides on the bottom surface thereof with the groove positioned longitudinally throughout the length of the brush member, a metal rib secured in and filling the groove in the bottom surface of the brush member, said rib having approximately two thirds of its cross section extending below the bottom surface out of the groove, an end member secured on each end of the brush member whereby the tensile, compressive and shrinkage forces created by the end members will essentially act only in a transverse direction on the carbon brush member, and a sheet metal cover provided from one side and across the bottom to the other side of the carbon brush covering the rib, the end members being secured over the respective ends of the brush member from one side to the other and over the metal rib.

2. Carbon sliding contact element according to claim 1, in which the sheet metal cover is secured to the two end members and is in contact with the rib.

References Cited in the file of this patent

UNITED STATES PATENTS

| 2,305,297 | Leuchs | Dec. 15, 1942 |

FOREIGN PATENTS

| 650,107 | Germany | Sept. 16, 1937 |
| 685,147 | Germany | Dec. 13, 1939 |
| 148,531 | Great Britain | Oct. 10, 1921 |